June 21, 1932. P. AVILLA 1,863,822
BAND SAW PULLEY DRIVE
Original Filed Jan. 8, 1930
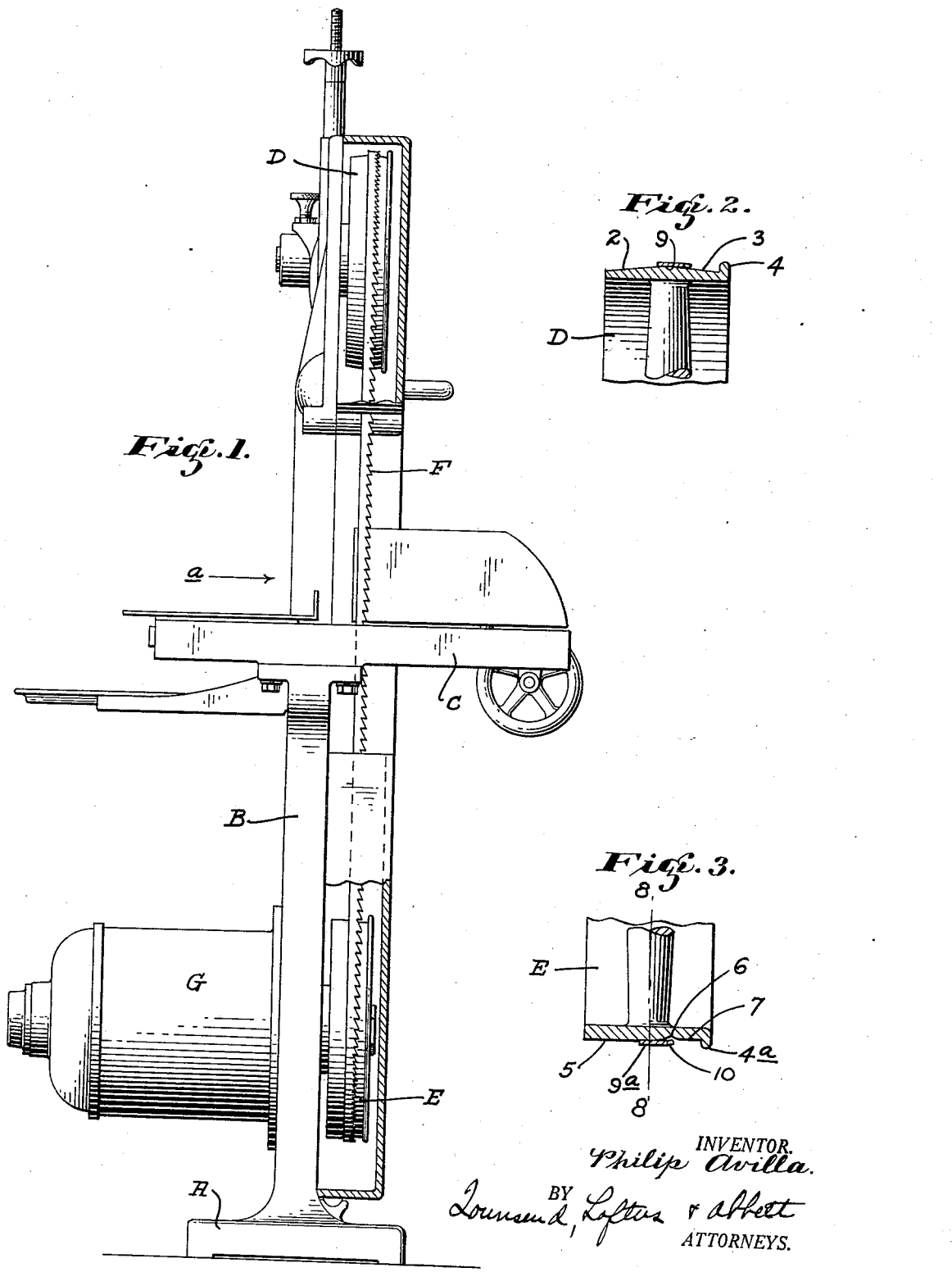

Patented June 21, 1932

1,863,822

UNITED STATES PATENT OFFICE

PHILIP AVILLA, OF DALY CITY, CALIFORNIA, ASSIGNOR OF TWO-FIFTHS TO T. E. HIMLE, OF BURLINGAME, CALIFORNIA

BAND SAW PULLEY DRIVE

Application filed January 8, 1930, Serial No. 419,359. Renewed September 21, 1931.

This invention relates to a band saw and especially to the pulleys whereby the band saw is supported and driven.

A band saw is usually supported and driven by means of a pair of crowned pulleys. Crowned pulleys are very satisfactory providing the saw is being handled by a skilled operator and provided the pulleys are positively aligned but if any misalignment develops, for instance through wear caused by end thrust through one or the other of the pulleys, or by bending or warping of the frame in which the pulleys are journalled trouble will develop as the saw will tend to come off or jump the pulleys the moment the slightest excess pressure is applied while work is being passed through the saw.

The object of the present invention is to generally improve and simplify the pulleys supporting and driving the saw, and especially, to provide pulley surfaces which will automatically return the saw blade if forced to one side or another of the pulley surface and which will retain the saw blade regardless of misalignment of the pulleys or otherwise.

The invention is shown by way of illustration in the accompanying drawing, in which—

Fig. 1 is a side elevation of a band saw, said elevation being partially broken away and sectioned to show the band saw driving and supporting pulleys, Fig. 2 is an enlarged section of the rim of the idling pulley, and Fig. 3 is an enlarged section of the rim of the driving pulley.

Referring to the drawing in detail, A indicates a base member, B a frame, C the table upon which the work is supported while passing through the saw, D an idling pulley, E a driving pulley, and F a band saw which is supported and driven by the pulleys. The pulleys D and E are, in this instance, journalled at the upper end and lower ends of the frame and the lower pulley is driven by an electric motor generally indicated at G. The frame, table, driving motor, etc., may be of standard construction. The improvement disclosed in the present instance being the shape of the pulley faces.

The idling pulley is best illustrated in Figs. 1 and 2. It is an ordinary pulley provided with a crown face as indicated by the lines 2 and 3, but it differs from the ordinary crown pulley in being provided with an exterior annular flange or rim 4, the function of which will be hereinafter described.

The driving pulley is best illustrated in Figs. 1 and 3. It is provided with a flat pulley surface such as shown at 5, an annular groove 6 and a second flat surface which has a diameter slightly less than the diameter presented by the flat surface 5. In other words, the surface 7 is slightly stepped or reduced in diameter with relation to the surface 5. This pulley is also provided with an annular rim or flange such as indicated at 4a. The main function of the flanges 4 and 4a being that of retaining the saw blade from complete removal from the pulleys if it should happen to be pulled towards the operator in the direction of arrow a for instance when removing work from the saw. The crown surface of the pulley indicated at 9 normally retains the saw blade at the center or the highest point of the crown. This is the natural function of a crown pulley as a belt or saw blade such as here illustrated has a tendency to climb an inclined surface. This function is well known. The center line of the idling pulley or in other words the peak of the crown will under normal conditions align with the center line indicated at 8—8 on the driving pulley and the blade will thus be retained in the position indicated at 9a. The teeth of the blade indicated at 10 aligning with the annular groove 6 so as to prevent flattening or injury of the teeth, the groove being sufficiently deep to prevent contact of the teeth with the pulley surface.

The position of the blade indicated at 8—8 in Fig. 3 is the normal running position of the blade and as the surface upon which the blade rides is flat, as here indicated, there is no tendency for the blade to move to one side of the pulley or the other. It may happen that an operator in passing work through the saw applies an excess pressure, in that instance the blade might be crowded downwardly over the inclined surface indicated at 2 on the idling pulley but it has no tendency to crawl or move over on the flat surface indicated at 5 hence the moment excess pressure is relieved the blade immediately climbs up the inclined surface 2 of the idling pulley thereby returning it to normal or running position. It is also possible particularly where an unskilled operator is running the saw that the work may be pulled away from the saw in the direction of arrow *a* too rapidly or may hang up on the work. In that case, the blade would be pulled downwardly over the inclined surface 3 of the idling pulley and it might possibly shift slightly in the same direction on the driving pulley. In fact, in extreme cases it might be pulled against the annular flanges indicated at 4 and 4a without doing any damage as it could not possibly come off or jump the pulley due to these flanges. The saw will even under such extreme conditions return to normal position as the flat surface 5 presents a larger diameter than the surface 7 and as the surface 3 is inclined in an upward direction the two surfaces will co-operate to return the blade to normal or running position. Pulley surfaces for supporting and driving the saw have accordingly been provided which will not only automatically return the blade to normal running position whether shifted to one side of the pulleys or the other, but they are also shaped to prevent removal of the blade when subjected to excess pressure and unskilled operation.

While certain features of the present invention are more or less specifically described, I wish it understood that various changes may be resorted to within the scope of the appended claims. Similarly, that the materials and finishes of the several parts employed may be such as the manufacturer may decide, or varying conditions or uses may demand.

Having thus described my invention, what I claim and desire to secure by Letters Patent is—

1. In a structure of the character described a frame, a pair of pulleys mounted on the frame, one of said pulleys presenting a crown pulley surface and the other a flat pulley surface, and a band saw supported by the pulleys.

2. In a structure of the character described a frame, a pair of pulleys mounted on the frame, one of said pulleys presenting a crown pulley surface and the other a flat pulley surface, a band saw supported by the pulleys, and an annular flange formed on one side of each pulley and projecting above the pulley surfaces.

3. In a structure of the character described a frame, an idler and a driving pulley mounted therein, the idler pulley presenting a crown pulley surface and the driving pulley a flat pulley surface, and a band saw supported and driven by the pulleys.

4. In a structure of the character described a frame, an idler and a driving pulley mounted thereon, said driving pulley presenting a pair of flat annular pulley surfaces of unequal diameter and having an annular groove formed between said surfaces, said idler pulley presenting a crown pulley surface and a band saw supported and driven by the pulleys, the teeth of the saw normally registering with the annular groove in the surface of the driving pulley to prevent the teeth of the saw from contacting with the pulley surface.

5. In a structure of the character described a frame, an idler and a driving pulley mounted thereon, said driving pulley presenting a pair of flat annular pulley surfaces of unequal diameter and having an annular groove formed between said surfaces, said idler pulley presenting a crown pulley surface and a band saw supported and driven by the pulleys, the teeth of the saw normally registering with the annular groove in the surface of the driving pulley to prevent the teeth of the saw from contacting with the pulley surface, and an annular flange formed on one side of each pulley and projecting above the adjacent pulley surfaces.

6. In a structure of the character described, a frame, a pair of pulleys mounted on the frame, one of said pulleys presenting a crown pulley surface and the other a flat pulley surface, and a band saw supported by the pulleys, said last-named pulley having an annular groove formed in its face at one side of the flat pulley surface to prevent the teeth of the saw from contacting with the pulley surface.

7. In a structure of the character described, a frame, an idler and a driving pulley mounted thereon, said driving pulley presenting a pair of annular pulley surfaces of unequal diameter, one of said surfaces being flat and said surfaces being separated by an annular groove, said idler pulley presenting a crown pulley surface, and a band saw supported and driven by the pulleys, the teeth of the saw normally registering with the annular groove in the surface of the driving pulley to prevent the teeth of the saw from contacting with the pulley surface.

PHILIP AVILLA.